May 24, 1938.　　　　　F. H. WELLS　　　　　2,118,125

SWITCH

Filed April 24, 1936

INVENTOR.
FRANKLIN H. WELLS
BY Jerome R. Cox
ATTORNEY.

Patented May 24, 1938

2,118,125

UNITED STATES PATENT OFFICE 2,118,125

SWITCH

Franklin H. Wells, South Bend, Ind., assignor to Bendix Products Corporation, South Bend, Ind., a corporation of Indiana Application April 24, 1936, Serial No. 76,140

2 Claims. (Cl. 200—82)

This invention relates to signal systems and more particularly to signal systems for motor vehicles equipped with hydraulic brakes.

One of the objects of this invention is to provide a signal arrangement for hydraulic brakes in which the pressure developed in the hydraulic brake system during the brake operation moves a piston which in turn operates an electric switch for signalling that the brakes are being applied.

A further object is the provision in such a system of a compressible member arranged to return the piston to its normal position and to thus render the signal inoperative upon the release of pressure.

A further object of the invention is to provide such a returning means which will also serve as an insulator of the electric system.

A further object of the invention is to reduce the travel of the piston used in operating the signal so that the loss of pedal travel will be reduced to a minimum.

One of the features of my invention is the provision of rubber blocks which are effective for returning the parts to their normal pressure released signal-off position.

Further objects and features of the invention will be apparent after a reading of the subjoined specification and claims and after a consideration of the accompanying drawing, in which:

Figure 1:
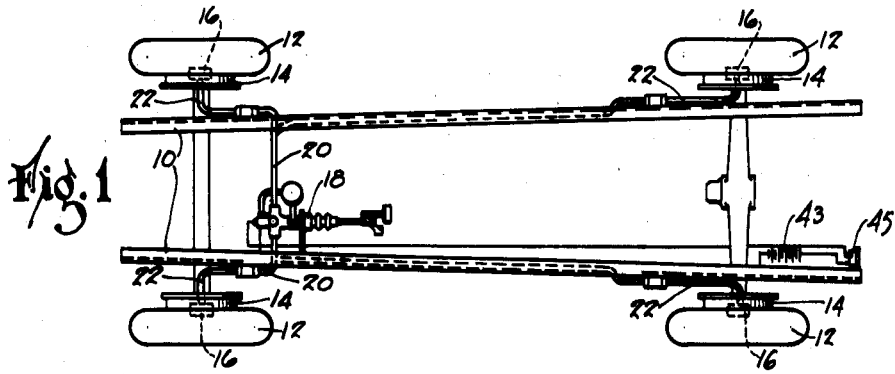
Figure 1 is a diagrammatic view of an automobile equipped with a hydraulic braking system and with a signal device constructed according to my invention.
Figure 2:
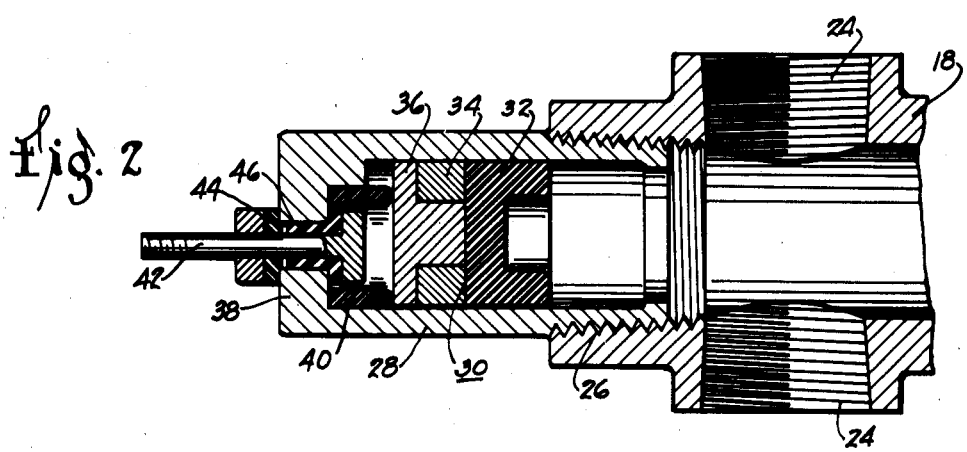
Figure 2 is an enlarged sectional view of the forward end of the master cylinder shown in Figure 1.

Referring in detail to the drawing, it may be seen that I have shown in Figure 1 an automobile provided with a frame 10, wheels 12, brakes 14 and wheel cylinders 16 arranged to operate said brakes. A master cylinder 18 is connected to the wheel cylinders 16 by conduits such as 20 and 22. The front end of the master cylinder is constructed as shown in Figure 2 with outlet openings 24 to which the conduits 20 are connected and with a threaded opening 26 to which my improved signal cylinder is threaded. My cylinder 28 is provided with a piston 30 comprising a rubber cup 32, an annular brass piston 34, and a copper insert 36. Positioned between the piston 30 and the forward end 38 of the cylinder 28 is an annular rubber cushion 40 which acts as a return spring. The casing of the cylinder 28 serves as a ground contact and when pressure is developed in the master cylinder the pressure urges the cup and piston 30 forward until the copper insert 36 contacts with a line contact formed by a bolt 42 which is insulated from the cylinder by Bakelite washers 44 and 46.

It is believed that the operation of my improved switch will be clear from the above description. When the pressure of the liquid in the master cylinder is increased to apply the brakes this increased pressure will urge the piston 30 forward and compressing the rubber springs 40 will move the copper insert 36 into contact with the bolt 42, thus completing the circuit between the battery 43 through the light 45, flashing the light and signalling to other drivers that the brake is being applied.

Figure 3:
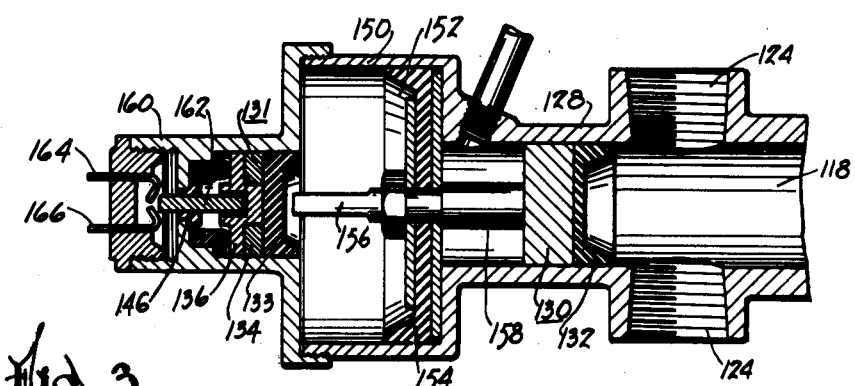
Figure 3 is a view similar to Figure 2 showing a modified form of device which might be substituted for the device shown in Figure 2.

In the modification shown in Figure 3, I have provided means whereby the loss of pedal travel due to operation of the signal will be minimized. Therein the master cylinder 118 is provided with a forward extension 128 and is formed with outlet openings 124 connected to the brakes. Within the extension 128 is a piston 130 provided with a sealing cup 132. The extension 128 is provided with an enlarged portion 150 within which there is a piston 152 provided with a sealing cup 154 and forward and rearward extensions 156 and 158 respectively. The rearward extension 158 contacts with the piston 130 so that movement forward of the piston 130 forces the piston 152 to move forward with it. A casing 160 formed as a cap which is threaded on the outer end of the extension 150 houses a third piston 131 which is provided with a rubber cup 133, a brass piston 134 and a copper insert 136. The insert 136 is formed with a forward extension 162 which is insulated therefrom and which extends through a Bakelite washer 146 but is adapted at times to complete an electric circuit by bridging terminals 164 and 166.

Thus when the pressure in the hydraulic master cylinder is increased, the piston 130 is urged forward and through the extension 158 forces the piston 152 forward. The liquid trapped between the piston 152 and the piston 131 forces the piston 131 forward at a much greater speed, thus bridging the terminals 164 and 166 and energizing the signal. Due to the greater speed of the piston 131 over that of the piston 152 the movement of the piston 130 is materially decreased with a consequent minimizing of the loss in pedal travel.

It is to be understood that the above-described embodiments of my invention are for the purpose of illustration only and various changes may be made therein without departing from the spirit and scope of the invention.

I claim:

1. A stop light switch for a hydraulic brake system comprising a cylinder, a piston acted upon by fluid pressure in the system, an element moved by said piston when acted upon by said pressure, and a stationary element with which said movable element contacts, said movable element comprising a piston having a rubber cup, a brass annular member, and a copper insert arranged to contact with the walls of the casing and upon energization of said piston to contact with the stationary contact element.

2. A stop light switch for a hydraulic brake system comprising a cylinder, a piston acted upon by fluid pressure in the system, an element moved by said piston when acted upon by said pressure, a rubber washer for returning the movable element to its inoperative position, and a stationary element with which said movable element contacts, said movable element comprising a piston having a rubber cup, a brass annular member, and a copper insert arranged to contact with the walls of the casing and upon energization of said piston to contact with the stationary contact element.

FRANKLIN H. WELLS.